United States Patent
Schulz et al.

(10) Patent No.: US 11,699,826 B2
(45) Date of Patent: Jul. 11, 2023

(54) BATTERY CELL COMPRISING AT LEAST ONE GALVANIC CELL, BATTERY, AND METHOD FOR PRODUCING A BATTERY CELL

(71) Applicant: Robert Bosch GmbH, Stuttgart (DE)

(72) Inventors: Leonhard Ferdinand Schulz, Weil der Stadt (DE); Martin Stoev, Constance (DE); Robert Hafenbrak, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 654 days.

(21) Appl. No.: 16/463,131

(22) PCT Filed: Nov. 8, 2017

(86) PCT No.: PCT/EP2017/078612
§ 371 (c)(1),
(2) Date: May 22, 2019

(87) PCT Pub. No.: WO2018/095734
PCT Pub. Date: May 31, 2018

(65) Prior Publication Data
US 2019/0280276 A1  Sep. 12, 2019

(30) Foreign Application Priority Data
Nov. 23, 2016 (DE) .................... 10 2016 223 194.4

(51) Int. Cl.
*H01M 50/209* (2021.01)
*H01M 50/548* (2021.01)

(52) U.S. Cl.
CPC ....... *H01M 50/209* (2021.01); *H01M 50/548* (2021.01)

(58) Field of Classification Search
CPC . H01M 50/502; H01M 50/548; H01M 50/209
See application file for complete search history.

(56) References Cited

U.S. PATENT DOCUMENTS 5,900,332 A * 5/1999 Marukawa .......... H01M 50/502
429/158
6,656,632 B2 * 12/2003 Asaka ................... H01M 50/55
429/178

(Continued)

FOREIGN PATENT DOCUMENTS

JP    H07142039 A    6/1995
JP    3333606 B2 *   10/2002

(Continued)

OTHER PUBLICATIONS

International Search Report for Application No. PCT/EP2017/078612 dated Jan. 19, 2018 (English Translation, 2 pages).

*Primary Examiner* — Milton I Cano
*Assistant Examiner* — Mary G Henshaw
(74) *Attorney, Agent, or Firm* — Michael Best & Friedrich LLP

(57) ABSTRACT

A battery cell comprises at least one galvanic cell, a first cell housing element, and a second cell housing element. The two cell housing elements jointly substantially completely enclose the galvanic cell. The first cell housing element has inner recesses on the inner surface thereof, which inner recesses are, on an outer surface of the first cell housing element lying immediately opposite the inner surface, outer protrusions for electrically contacting a first further battery cell. First compensation elements are complementary to the inner recesses in such away and are arranged in the inner recesses in such a way that the first compensation elements, together with the inner recesses, form a substantially flat inner surface of the first cell housing element.

14 Claims, 3 Drawing Sheets

(56) References Cited

U.S. PATENT DOCUMENTS

| | | | |
|---|---|---|---|
| 10,062,882 B2* | 8/2018 | Schoenherr | H01M 50/20 |
| 2004/0258985 A1 | 12/2004 | Tsai | |
| 2009/0233465 A1* | 9/2009 | Mizoguchi | H05K 3/326 |
| | | | 439/74 |
| 2012/0251857 A1* | 10/2012 | Neuhold | H01M 50/172 |
| | | | 429/82 |
| 2015/0037617 A1 | 2/2015 | Cabiri | |
| 2016/0190668 A1* | 6/2016 | Satou | H01M 50/531 |
| | | | 429/403 |
| 2017/0054120 A1* | 2/2017 | Templeman | H01M 50/20 |
| 2019/0348651 A1* | 11/2019 | Templeman | H01M 50/20 |

FOREIGN PATENT DOCUMENTS

| | | |
|---|---|---|
| JP | 2005259379 A | 9/2005 |
| JP | 2005285455 A | 10/2005 |
| JP | 2013143331 | 7/2013 |
| WO | 2011069651 | 6/2011 |
| WO | 2012150047 | 11/2012 |

\* cited by examiner

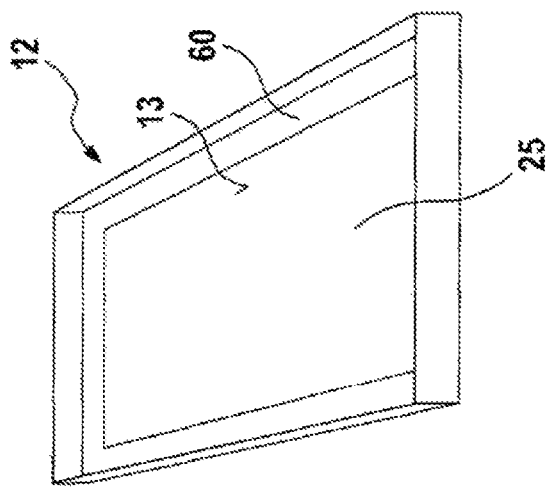
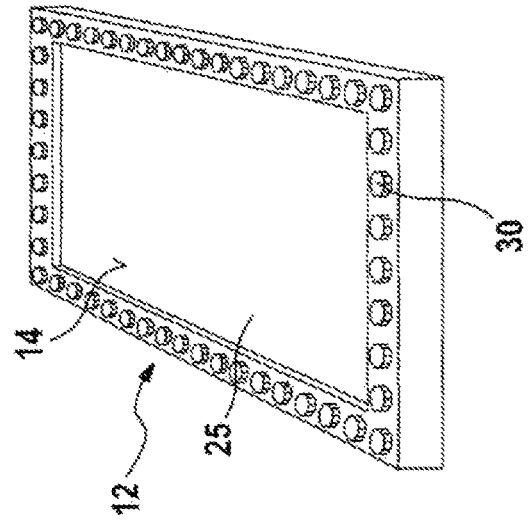
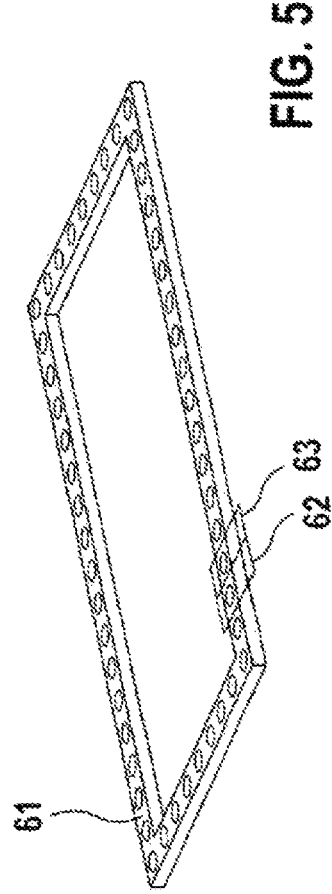
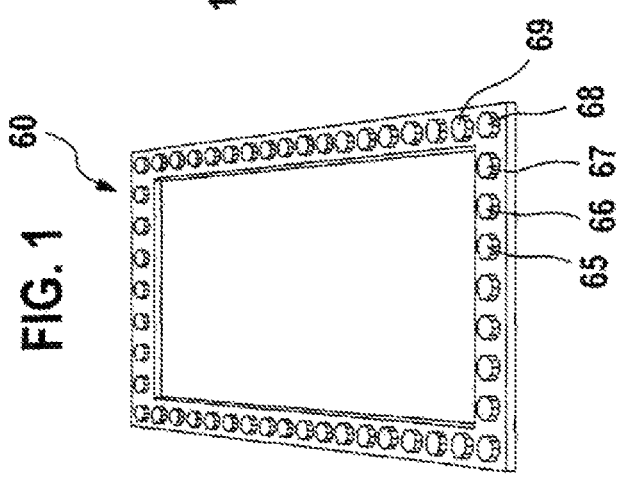
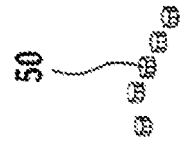

BATTERY CELL COMPRISING AT LEAST ONE GALVANIC CELL, BATTERY, AND METHOD FOR PRODUCING A BATTERY CELL

BACKGROUND OF THE INVENTION

The invention relates to a battery cell comprising at least one galvanic cell, a battery and a method for producing a battery cell.

A multiplicity of battery cells that comprise at least one galvanic cell are known. The battery cells each typically comprise a cell housing that encloses or surrounds the galvanic cells.

The cell housings of the battery cells frequently comprise protrusions and/or depressions in order that the cell housings or the galvanic cells in the cell housings may be electrically connected to further battery cells. The protrusions and/or depressions may be formed by way of example by means of a deep drawing process. As a consequence, each protrusion on the outer face of the cell housing represents a depression on the inner face of the cell housing and each depression on the outer face of the cell housing represents a protrusion on the outer face of the cell housing.

This is encumbered by the disadvantage that generally pressure spikes may occur at the galvanic cell in the cell housing, since the galvanic cell is only in spot contact or rather not in a large-area contact with the inner face of the cell housing. This is particularly the case for battery cells that comprise a multiplicity of galvanic cells, for example three or more that are arranged one above the other. In so doing, it is possible as a result of the weight force and/or compressive force for pressure to be typically distributed in an inhomogeneous manner in the (lowermost) galvanic cell. In addition, the galvanic cells may generally expand during the charging/discharging process, as a result of which said galvanic cells are pressed against the uneven inner face of the cell housing, which likewise usually results in the pressure being distributed in an inhomogeneous manner.

This may lead under adverse conditions to the galvanic cells becoming damaged. This may also lead under adverse conditions to the serviceable life of the battery cell being reduced.

Furthermore, it is generally necessary to configure the cell housing in such a manner that it is able to withstand pressure spikes and this requirement typically increases the weight of the cell housing.

SUMMARY OF THE INVENTION

Embodiments of the present invention may advantageously render it possible to demonstrate a battery cell, in particular a lithium ion battery cell or a battery, in particular a lithium ion battery, or a method for producing a battery cell, wherein the pressure of the cell housing is distributed in a homogeneous manner to the galvanic cell.

In accordance with one aspect of the invention, a battery cell is proposed that comprises at least one galvanic cell, and a first cell housing element and a second cell housing element, wherein the two cell housing elements jointly essentially completely enclose the galvanic cell, wherein the first cell housing element comprises on its inner face inner depressions that are outer protrusions on an outer face of the first cell housing element, said outer face lying directly opposite the inner face, so as to provide electrical contact with a first further battery cell, and/or the second cell housing element comprises on its inner face inner protrusions that are outer depressions on an outer face of the second cell housing element, said outer face lying directly opposite the inner face, so as to provide electrical contact with a second further battery cell, characterized by first compensating elements and/or second compensating elements, wherein the first compensating elements are configured in such a complementary manner with respect to the inner depressions and are arranged in such a manner in the inner depressions that the first compensating elements together with the inner depressions form an essentially flat inner surface of the first cell housing element, and/or the second compensating elements are configured in such a complementary manner with respect to the inner protrusions and arranged in such a manner that the second compensating elements together with the inner protrusions form an essentially flat inner face of the second cell housing element.

One advantage of this is that the forces that act on the galvanic cell are usually low or that the forces that occur between the galvanic cell and the cell housing are distributed in a homogeneous manner. A large area of the galvanic cell is in contact with the inner face of the cell housing or of the cell housing element or the inner faces of the cell housing element. Generally, the pressure spikes that occur in the battery cell or in the galvanic cell are only small or they do not occur at all and the pressure that does occur, in particular weight pressure, is distributed essentially in a homogeneous manner over the galvanic cell. This typically leads to the fact that the cell housing and also the outer casing of the galvanic cell may be configured with a thin wall with the result that the weight is reduced. In addition, the battery cell generally has a long serviceable life. Furthermore, the forces that act on the galvanic cell are usually low.

In accordance with a second aspect of the invention, a battery is proposed that comprises at least two battery cells in accordance with the invention, wherein the outer protrusions of the first of the battery cells are arranged at least in part in outer depressions of a second of the battery cells, wherein the battery cells are connected in an electrical manner to one another via the outer protrusions and the outer depressions.

As a consequence, a technically simple electrical connection is generally produced between the battery cells. Furthermore, the battery is generally configured in a particularly dimensionally stable manner.

In accordance with a third aspect of the invention, a method is proposed for producing a battery cell, wherein the battery cell comprises at least one galvanic cell and a cell housing, wherein the cell housing comprises at least a first cell housing element and at least a second cell housing element, wherein the two cell housing elements jointly essentially completely enclose the galvanic cell, wherein the first cell housing element comprises an inner face having inner depressions that are outer protrusions on an outer face of the first cell housing element, said outer face lying directly opposite the inner face, so as to provide electrical contact with a first further battery cell, and/or the second cell housing element comprises an inner face having inner protrusions that are outer depressions on an outer face of the second cell housing element, said outer face lying directly opposite the inner face, so as to provide electrical contact with a second further battery cell, wherein the method includes the following steps:
providing the first cell housing element and the second cell housing element;
providing the galvanic cell;

applying a compensating material to the inner face of the second cell housing element around the inner protrusions so as to form a flat surface of the inner face of the second cell housing element and/or
applying said compensating material into the inner depressions of the first cell housing element so as to form a flat surface of the inner face of the first cell housing element; and essentially completely enclosing the galvanic cell with the two cell housing elements in such a manner that the galvanic cell is enclosed between the inner faces of the two cell housing elements in a hollow space that is formed by the two cell housing elements.

One advantage of this is that in the case of the battery cell that is produced using said method, forces that act on the galvanic cell are usually reduced or distributed uniformly. A large area of the galvanic cell contacts the inner face of the cell housing element or the inner faces of the cell housing element. Generally, pressure spikes do not occur in the battery cell or any such pressure spikes are only small and the pressure that occurs, in particular weight pressure, is distributed essentially in a homogeneous manner over the galvanic cell. This typically leads to the fact that the cell housing and also the outer casing of the galvanic cell may be configured with a thin wall and as a result the weight is reduced. In addition, the battery cell that is produced by means of the method generally has a long serviceable life. Furthermore, usually low forces act on the galvanic cell. The method may also generally be implemented in a technically simple manner. In addition, the inner face of the cell housing element is configured in a particularly planar manner.

Ideas relating to the embodiments of the present invention may be regarded inter alia as relating to the thoughts and findings described below.

In accordance with one embodiment, the inner face of the first cell housing element and/or the inner face of the second cell housing element comprise(s) in each case an essentially flat expansion region, wherein the inner depressions of the first cell housing element enclose the expansion region of the first cell housing element, and the inner protrusions of the second cell housing element enclose the expansion region of the second cell housing element. One advantage of this is that generally the galvanic cell is able to expand in the expansion region without forces being transmitted to the battery cells that are adjacent to the battery cell. Consequently, the mechanical and/or electrical contact between the battery cells and a further battery cell is not impaired as the galvanic cells expand.

In accordance with one embodiment, the first compensating elements are connected to one another and/or the second compensating elements are connected to one another. This renders it possible for the compensating elements to be arranged and oriented generally in a technically simple manner. This typically reduces the time required to produce the battery cell.

In accordance with one embodiment, the first compensating elements and/or the second compensating elements comprise a plastic material, in particular the first compensating elements and/or the second compensating elements consist of a plastic material. One advantage of this is that usually the production costs of the battery cell are low.

In accordance with one embodiment, the first compensating elements and/or the second compensating elements are only arranged in regions between the inner face of the first cell housing element and the galvanic cell and/or between the inner face of the second cell housing element and the galvanic cell. One advantage of this is that generally as little material or space as possible is required for the compensating elements, since the amount of material used for the compensating elements is only as much as is absolutely necessary for producing a flat inner face. As a result, it is usually not necessary to cover regions of the inner face of the cell housing element that are already flat. This usually increases the space available for the galvanic cell or the galvanic cells and consequently increases the storage capacity of the battery cell. Furthermore, the costs are generally reduced as a result.

In accordance with one embodiment, the compensating material is only applied in regions to the inner face of the first cell housing element and/or of the second cell housing element. One advantage of this is that in the case of this method generally as little material or space as possible is required for the compensating elements, since the amount of material used for the compensating elements is only as much as is absolutely necessary for producing a flat inner face. As a result, it is usually not necessary to cover regions of the face of the cell housing element that are already flat. This usually increases the space available for the galvanic cell or the galvanic cells and consequently increases the storage capacity of the battery cell. Furthermore, the costs are generally reduced as a result.

In accordance with one embodiment, the compensating material is applied around an expansion region of the first cell housing element and/or of the second cell housing element. One advantage of this is that generally the galvanic cell is able to expand in the expansion region without forces being transmitted to the battery cells that are adjacent to the battery cell. Consequently, the mechanical and/or electrical contact between the battery cells and a further battery cell is not impaired as the galvanic cells expand.

In accordance with one embodiment, the compensating material is applied in such a manner that the compensating material forms a continuous surface. One advantage of this is that the compensating material may generally be applied rapidly. This usually reduces the production time.

Reference is made to the fact that some of the possible features and advantages of the invention are described herein with reference to different embodiments of the battery cell or of the method for producing the battery cell. A person skilled in the art recognizes that the features may be combined, adapted or exchanged in a suitable manner in order to arrive at further embodiments of the invention.

BRIEF DESCRIPTION OF THE DRAWINGS

Embodiments of the invention are described below with reference to the attached drawings, wherein neither the drawings nor the description are to be regarded as limiting the invention.

FIG. 1 illustrates a perspective view of a mat comprising first compensating elements of a battery cell according to one embodiment in accordance with the invention;

FIG. 2 illustrates a perspective view of the upper face of a cell housing element of a battery cell according to one embodiment in accordance with the invention;

FIG. 3 illustrates a perspective view of the lower face of the cell housing element that is shown in FIG. 2, wherein the mat that is shown in FIG. 1 is arranged in the cell housing element;

FIG. 4 illustrates multiple individual first compensating elements;

FIG. 5 illustrates a mat comprising second compensating elements;

The figures are merely schematic and not true to scale. Like reference numerals refer to like or like-functioning features in the figures.

DETAILED DESCRIPTION

Figure 6:
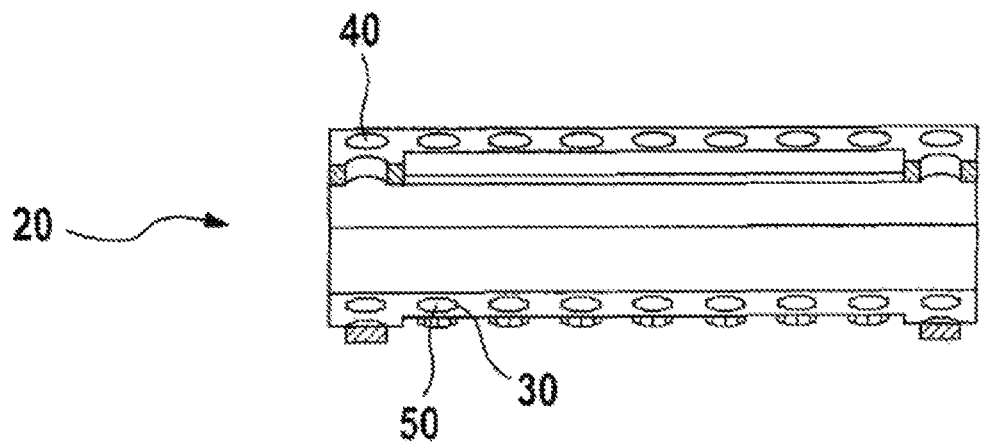
FIG. 6 illustrates a cross sectional view of a battery cell with compensating elements arranged thereon.

FIG. 1 illustrates a perspective view of a mat 60 comprising first compensating elements 50, 65-69 of a battery cell 20 according to one embodiment in accordance with the invention. FIG. 2 illustrates a perspective view of the upper face of a first cell housing element 12 of a battery cell 20 according to one embodiment in accordance with the invention. FIG. 3 illustrates a perspective view of the lower face of the first cell housing element 12 that is shown in FIG. 2, wherein the mat 60 that is shown in FIG. 1 is arranged in the first cell housing element 12.

The battery cell 20 in accordance with the invention comprises at least one galvanic cell, a first cell housing element 12 and a second cell housing element 16. The two cell housing elements 12, 16 jointly surround or enclose the galvanic cell or galvanic cells. The two cell housing elements 12, 16 jointly form an essentially cuboid inner space or hollow space in which the galvanic cell is arranged. The galvanic cell is connected, for example on a side face of the hollow space, to the first cell housing element 12 and the second cell housing element 16, which are electrically insulated with respect to one another, with the result that the first cell housing element 12 and the second cell housing element 16 are at different electrical potentials.

The first cell housing element 12 comprises on its outer face 14 outer protrusions 30 that represent or are inner depressions 30 on its inner face 13 that lies directly opposite the outer face 14. The inner face 17 of the second cell housing element 16 comprises on its outer face 18 outer depressions 40 that represent or are inner protrusions 40 on its inner face 17 that lies directly opposite the outer face 18.

FIG. 2 illustrates the outer protrusions 30 on the outer face 14 (at the top in FIG. 2) of the first cell housing element 12. The outer protrusions 30 are arranged around a quadrilateral flat expansion region 25 of the first cell housing element 12. FIG. 3 illustrates a perspective view of the lower face of the cell housing element 12 that is shown in FIG. 2, wherein the mat 60 that is shown in FIG. 1 is arranged in the first cell housing element 12, and FIG. 3 also illustrates the inner face 13 of the first cell housing element 12, wherein the first cell housing element 12 in FIG. 3 is rotated with respect to FIG. 1 about a horizontal axis by 180°.

The outer protrusions 30 and/or outer depressions 40 are configured so as to provide physical contact with the directly adjacent battery cell 20. The outer protrusions 30 and/or outer depressions 40 are configured so as to electrically connect the battery cell 20 to a directly adjacent battery cell 20.

When stacking or arranging the battery cells 20 one on top of the other, wherein the positions of the battery cells 20 are displaced in a purely translatory manner in a direction parallel with the forces of gravitation, the battery cells 20 that are directly adjacent to one another are spaced apart with respect to one another in the expansion regions 25 of the cell housing elements 12, 16. In this case, the galvanic cell or the cell housing element 12, 16 is able to expand in this region without stresses arising and without changes occurring in the contact between the battery cells 20 that are directly adjacent to one another.

In order to achieve a flat or planar or even inner face 13 for contacting a galvanic cell, first compensating elements 50, 65-69 are arranged in the inner depressions 30 of the first cell housing element 12. The first compensating elements 50, 65-69 are arranged in the inner depressions 30 or recesses or outer protrusions 30 of the first cell housing element 12. In the case of the cell housing element 12 that is illustrated in FIG. 2 and FIG. 3, it is possible to use for this purpose the mat 60, which is illustrated in FIG. 1, comprising compensating elements 50, 65-69. The mat 60 comprises a plurality of first compensating elements 50, 65-69 in the form of protrusions that are configured in a complementary manner with respect to the inner depressions 30 on the inner face 13 of the first cell housing element 12. The protrusions on the mat 60 are arranged in FIG. 3 in the inner depressions 30 of the inner face 13 of the first cell housing element 12.

The mat 60 is essentially configured as a quadrilateral. The mat 60 extends around a free region (which does not comprise any material of the mat 60). This free region is used so as to provide a volume into which the galvanic cell is able to expand. In addition, the inner face 13 of the first cell housing element 12 is already configured in a flat or planar manner in this free region of the mat 60.

By virtue of arranging the mat 60 comprising first compensating elements 50, 65-69 on the inner face 13 of the first cell housing element 12 and inserting the protrusions or first compensating elements 50, 65-69 of the mat 60 into the inner depressions 30 of the first cell housing element 12, a flat or even inner face 13 of the first cell housing element 12 is formed. A large area of this inner face 13 of the first cell housing element 12 is in contact with the galvanic cell after the galvanic cell has been inserted into the cell housing.

The galvanic cell likewise comprises on its outer face a flat or planar or even surface. This renders it possible to transmit forces, in particular weight forces, over a large area from the galvanic cell to the cell housing or the cell housing element 12 and conversely. A uniform force distribution is achieved as a result without pressure spikes.

The cell housing element 12, 16 may be one half of the cell housing. The first cell housing element 12 may be configured in a structurally identical manner to the second cell housing element 16.

FIG. 4 illustrates multiple individual first compensating elements 50, 65-69. The compensating elements 50, 65-69 may be individual compensating elements 50, 65-69, as illustrated in FIG. 4. The individual compensating elements 50, 65-69 are inserted into the inner depressions 30 of the galvanic cell.

FIG. 5 illustrates a mat 61 comprising second compensating elements 62, 63. In FIG. 5, the second compensating elements 62, 63 are flat elements that each comprise a through-going passage or a hole in the middle. The hole is used to receive an inner protrusion of the inner face 17 of the second cell housing element 16.

A mat 61 that comprises recesses or depressions is used so as to compensate for inner protrusions 40 on the inner face 17 of the second cell housing element 16. The inner protrusions 40 of the inner face 17 of the second cell housing element 16 are inserted into the recesses or depressions of the mat 61. In this manner, a planar or flat or even inner face 17 of the second cell housing element 16 is formed for contacting the flat or even or planar surface of the galvanic cell. The recesses or depressions pass through the entire height of the mat 61. This means that the recesses or depressions are holes in the mat 61.

The compensating elements 50, 65-69 or the flat surface of the galvanic cell may also be formed in that a compensating material is applied to a first inner face 13 of the first cell housing element 12 and/or of the second cell housing element 16. The surface of the applied material is smoothed flat or kept flat during the production procedure or thereafter.

After the compensating material has been applied in a liquid or viscous form (for example by means of dispensing), the compensating material surrounds the inner protrusions 40 of the inner face 17 of the second cell housing element 16 and/or penetrates into the inner depressions 30 of the first cell housing element 12. In this manner, the compensating elements 50, 65-69 are formed. This also renders it possible using the compensating material to smooth out uneven or irregular inner protrusions 40 and/or inner depressions 30.

It is also conceivable that the compensating elements 50, 65-69 are applied in a solid form to the inner face 13 of the first cell housing element 12 and/or the inner face 17 of the second cell housing element 16.

FIG. 6 illustrates a cross sectional view of a battery cell 20 comprising individual first compensating elements 50 arranged thereon. Individual first compensating elements 50 are inserted into the outer protrusions 30 of the (in FIG. 6 lower face of the) battery cell 20. This produces a planar or even surface on the lower face illustrated in FIG. 6 for contacting a (planar or flat) inner face of the cell housing 10. In the case of the second cell housing element 16, at the top in FIG. 7, inner protrusions 40 are formed on its inner face, said inner protrusions being surrounded by second compensating elements 62, 63.

Figure 7:
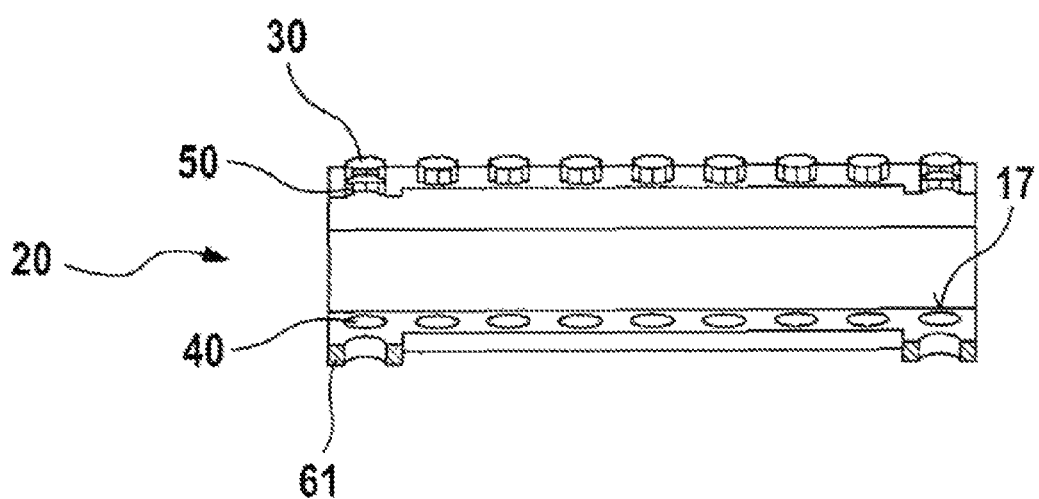
FIG. 7 illustrates a cross sectional view of a battery cell with compensating elements arranged thereon.

FIG. 7 illustrates a cross sectional view of a battery cell 20 comprising compensating elements 50, 65-69, 62, 63 arranged thereon. In this case, individual first compensating elements 50, 65-69 are arranged in the inner depressions 30 of the first cell housing element 12 (at the top in FIG. 7). The inner protrusions 40 of the second cell housing element 16 (at the bottom in FIG. 7) are framed by a mat 61 comprising second compensating elements 62, 63 that surround the inner protrusions 40 of the second cell housing element 16. Consequently, a flat inner face 13 of the first cell housing element 12 (at the top in FIG. 7) and a flat inner face 17 of the second cell housing element 16 (at the bottom in FIG. 7) are formed by means of the first 50, 65-69 and second 62, 63 compensating elements.

The mat 61 surrounds the inner protrusions 40 of the galvanic cell. The recesses of the mat 61 are configured in a complementary manner with respect to the inner protrusions 40 of the inner face 17 of the second cell housing element 16. The individual first compensating elements 50, 65-69 are configured in a complementary manner with respect to the inner depressions 30 of the inner face 13 of the first cell housing element 12.

The fact that the inner depressions 30 and the free spaces between the inner protrusions 40 are filled increases or improves the material elasticity constant of the inner protrusions 40 and of the inner depressions 30 in a direction in parallel with the face from which the inner protrusions 40 or outer protrusions 30 protrude. This consequently increases the stability or elasticity of the battery cell 20.

It is consequently possible to represent the compensating elements 50, 65-69, 62, 63 either in a positive configuration or in a negative configuration that is configured in a complementary manner with respect to the inner protrusions 40/outer depressions 40 and/or inner depressions 30/outer protrusions 30.

The number of battery cells 20 that are arranged one above the other or are stacked one above the other may amount to two, three, four, five or more than five. The battery cells 20 may be electrically connected to one another in a technically simple manner by means of the outer protrusions 30 and the outer depressions 40.

It is likewise conceivable that an expansion region is not provided in the case of the cell housing elements 12, 16.

The material of the compensating elements 50, 65-69, 62, 63 may comprise plastic material or natural materials, such as for example rubber or a similar material. The compensating elements 50, 65-69, 62, 63 may be configured from a foam material or may comprise a foam material. It is also conceivable that the compensating elements 50, 65-69, 62, 63 comprise a hard surface or are configured from a hard material. This enables any occurring forces to be transmitted in a particularly efficient manner.

The cell housing may comprise metal and/or a metal alloy. It is also conceivable that the cell housing is configured from metal and/or a metal alloy. It is also conceivable that the cell housing consists of a plastic material or comprises a plastic material.

The cell housing is configured in an essentially cuboid shape. Other shapes are conceivable.

Figure 8:
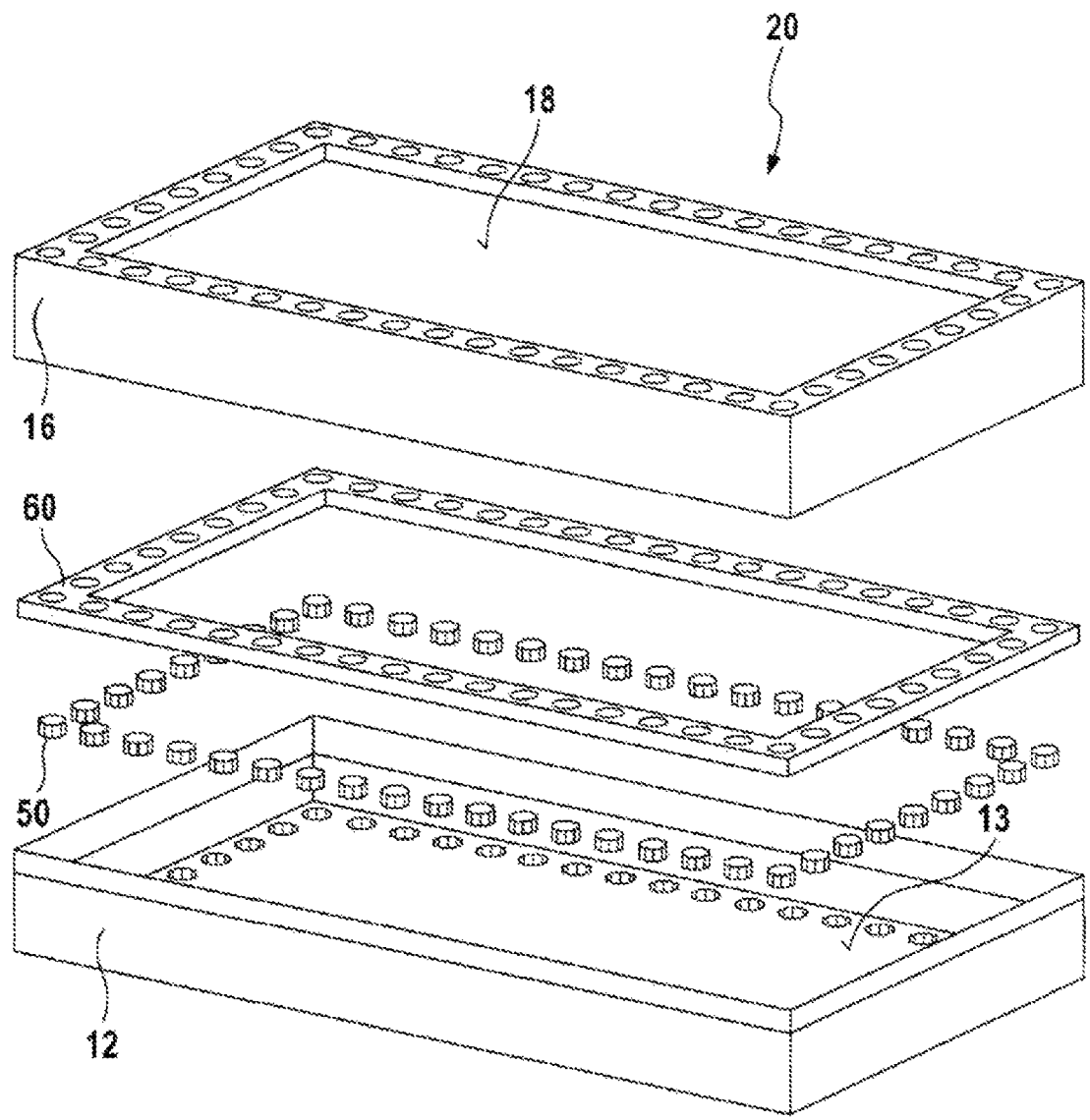
FIG. 8 illustrates a pseudo-exploded view of a battery cell with first and second compensating elements without a galvanic cell.

FIG. 8 illustrates a pseudo-exploded view of a battery cell 20 with first 50, 65-69 and second 62, 63 compensating elements without a galvanic cell. The galvanic cell is arranged between the inner faces 13, 17 of the two cell housing elements 12, 16. The inner face 13 of the first cell housing element 12 (at the bottom in FIG. 8) comprises a flat inner face 13 by means of the individual first compensating elements 50, 65-69 that are each arranged in the inner depressions 30 of the first cell housing element 12. The inner face 17 of the second cell housing element 16 (at the top in FIG. 8) likewise comprises a flat inner face 17 by means of the mat 61 comprising second compensating elements 62, 63 that surround the inner protrusions 40 of the inner face 17. Consequently, the galvanic element contacts two planar or flat inner faces 13, 17 of the two cell housing elements 12, 16 that jointly form the cell housing. Simultaneously, the cell housing comprises on its outer face outer protrusions 30 (not illustrated in FIG. 8) and outer depressions 40 (at the top in FIG. 8).

Finally, it is to be noted that terms "comprising", "including", etc. do not exclude any other elements or steps and terms such as "a" or "one" do not exclude a multiplicity. Reference numerals in the claims are not to be regarded as limiting.

The invention claimed is:

1. A plurality of battery cells (20) comprising
a first battery cell (20) having
at least one galvanic cell, and
a first cell housing element (12) and a second cell housing element (16),
wherein the first and second cell housing elements (12, 16) jointly enclose the galvanic cell,
wherein the first cell housing element (12) comprises on an inner face (13) thereof inner depressions (30) that are outer protrusions (30) on an outer face (14) of the first cell housing element (12), said outer face lying directly opposite the inner face (13), wherein the first battery cell (20) further comprises compensating elements,
wherein the compensating elements (50, 65-69) are configured in such a complementary manner with respect to the inner depressions (30) and are arranged in such a manner in the inner depressions (30) that the compensating elements (50, 65-69) together with the inner depressions (30) form a flat inner surface (13) of the first cell housing element (12), and a second battery cell (20) having on an outer face thereof outer depressions (40) that are inner protrusions on an inner face of the second battery cell (20), the outer face of the second battery cell directly opposite the inner face of the second battery cell, wherein the outer protrusions (30) of the first battery cell (20) are nestled in the outer depressions (40) of the second battery cell (20), and wherein the first and second battery cells (20) are electrically connected to one another via an interlocking of the outer protrusions (30) and the outer depressions (40).

2. The plurality of battery cells (20) as claimed in claim 1, wherein the inner depressions (30) of the first cell housing element (12) are arranged around a perimeter of the first cell housing element (12).

3. The plurality of battery cells (20) as claimed in claim 1, wherein the compensating elements (50, 65-69) are connected to one another.

4. The plurality of battery cells (20) as claimed in claim 1, wherein the compensating elements (50, 65-69) comprise a plastic material.

5. The plurality of battery cells (20) as claimed in claim 1, wherein the compensating elements (50, 65-69) are arranged only in regions between the inner face (13) of the first cell housing element (12) and the galvanic cell.

6. The plurality of battery cells (20) battery cell (20) as claimed in claim 1, wherein the first compensating elements (50, 65-69) consist of a plastic material.

7. The plurality of battery cells as claimed in claim 1, wherein each of the outer depressions (40) of the second battery cell (20) is a deep-drawn structure.

8. A plurality of battery cells (20) comprising a first battery cell (20) having
   at least one galvanic cell, and
   a first cell housing element (12) and a second cell housing element (16),
   wherein the two cell housing elements (12, 16) jointly enclose the galvanic cell,
   wherein the second cell housing element (16) comprises on an inner face (17) thereof inner protrusions (40) that are outer depressions (40) on an outer face (18) of the second cell housing element (16), said outer face lying directly opposite the inner face (17),
   wherein the first battery cell (20) further comprises compensating elements (62, 63),
   wherein the compensating elements (62, 63) are configured in a complementary manner with respect to the inner protrusions (40),
   wherein each of the compensating elements (62, 63) includes a through hole configured to receive one of the inner protrusions (40), and
   a second battery cell (20), wherein outer protrusions (30) of the second battery cell (20) are nestled in the outer depressions (40) of the first battery cell (20), and wherein the first and second battery cells (20) are electrically connected to one another via an interlocking of the outer protrusions (30) and the outer depressions (40).

9. The plurality of battery cells (20) as claimed in claim 8, wherein the inner protrusions (40) of the second cell housing element (16) are arranged around a perimeter of the second cell housing element (16).

10. The plurality of battery cells (20) as claimed in claim 8, wherein the compensating elements (62, 63) are connected to one another.

11. The plurality of battery cells (20) as claimed in claim 8, wherein the compensating elements (62, 63) comprise a plastic material.

12. The plurality of battery cells (20) as claimed in claim 8, wherein the compensating elements (62, 63) are arranged only in regions between the inner face (17) of the second cell housing element (16) and the galvanic cell.

13. The plurality of battery cells (20) battery cell (20) as claimed in claim 8, wherein the compensating elements (62, 63) consist of a plastic material.

14. The plurality of battery cells as claimed in claim 8, wherein the compensating elements (62, 63) are arranged in such a manner that the compensating elements (62, 63) together with the inner protrusions (40) form a flat inner face (17) of the second cell housing element (16).

* * * * *